United States Patent [19]

St-Pierre et al.

[11] Patent Number: 5,680,888
[45] Date of Patent: Oct. 28, 1997

[54] SAW TRIMMER AND METHOD FOR TRIMMING LUMBER PIECES

[75] Inventors: Michel St-Pierre, Normandin; Jean Pelletier, St-Félicien; Gérald Dion, Roberval, all of Canada

[73] Assignee: Gemofor, Inc., Normandin, Canada

[21] Appl. No.: 712,898

[22] Filed: Sep. 12, 1996

[51] Int. Cl.[6] .................................................. B27B 1/00
[52] U.S. Cl. ........................ 144/357; 83/367; 83/370; 83/418; 83/422; 83/732; 83/100; 144/2.1; 144/133.1; 144/245.2; 144/245.1; 144/246.1; 144/250.17; 144/250.12; 144/379
[58] Field of Search .................... 144/2.1, 133.1, 144/133.2, 356, 357, 379, 242.1, 245.1, 245.2, 245.4, 246.1, 250.17, 250.12; 83/100, 364, 367, 370, 409, 418, 422, 423, 424, 425.2, 425.4, 471.2, 483, 484, 709, 734

[56] References Cited

U.S. PATENT DOCUMENTS

| | | | |
|---|---|---|---|
| 820,855 | 5/1906 | Erickson. | |
| 1,148,169 | 7/1915 | Howe. | |
| 1,610,623 | 12/1926 | Shipley | 144/133.2 |
| 1,802,514 | 4/1931 | Johnson. | |
| 2,039,017 | 4/1936 | McLeod. | |
| 3,735,787 | 5/1973 | Siel | 144/133.1 |
| 3,990,568 | 11/1976 | Wilson, Sr. | 83/422 |
| 4,031,790 | 6/1977 | Arvidsson | 83/425.4 |
| 5,287,782 | 2/1994 | Scott | 83/422 |
| 5,447,186 | 9/1995 | Archard | 144/357 |

*Primary Examiner*—W. Donald Bray
*Attorney, Agent, or Firm*—Ware, Fressola, Van Der Sluys & Adolphson LLP

[57] ABSTRACT

The saw trimmer is used for trimming lumber pieces. The saw trimmer comprises a conveyor for longitudinally moving lumber pieces across the saw trimmer. The lumber pieces are transversely disposed on the conveyor with reference to the longitudinal direction. A plurality of adjacent drop saw assemblies are located above the conveyor. Each drop saw assembly comprises a circular saw blade parallel to the longitudinal direction, a corresponding hydraulic motor and an actuated positioning system for selectively raising and lowering the saw blade. Each lumber piece is held during the trimming thereof by a retaining assembly comprising a plurality of spaced-apart and parallel elongated rails positioned above the conveyor and extending longitudinally. These rails engage the upper surface of the lumber pieces. A plurality of rolls are positioned under a corresponding rail with an upper edge emerging above the conveyor and are driven into rotation. These rolls engage the bottom surface of the lumber pieces. A computer controls and synchronizes the operations of the various elements. The present saw trimmer may be operated at higher production speed and still performing very good and precise trimmings, compared to previously known saw trimmers.

27 Claims, 4 Drawing Sheets

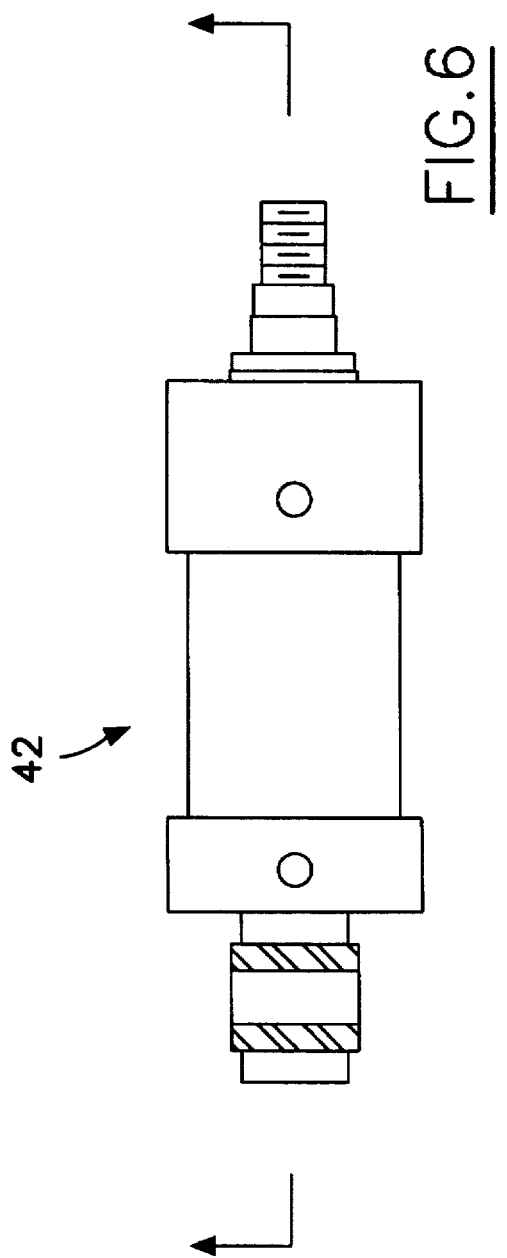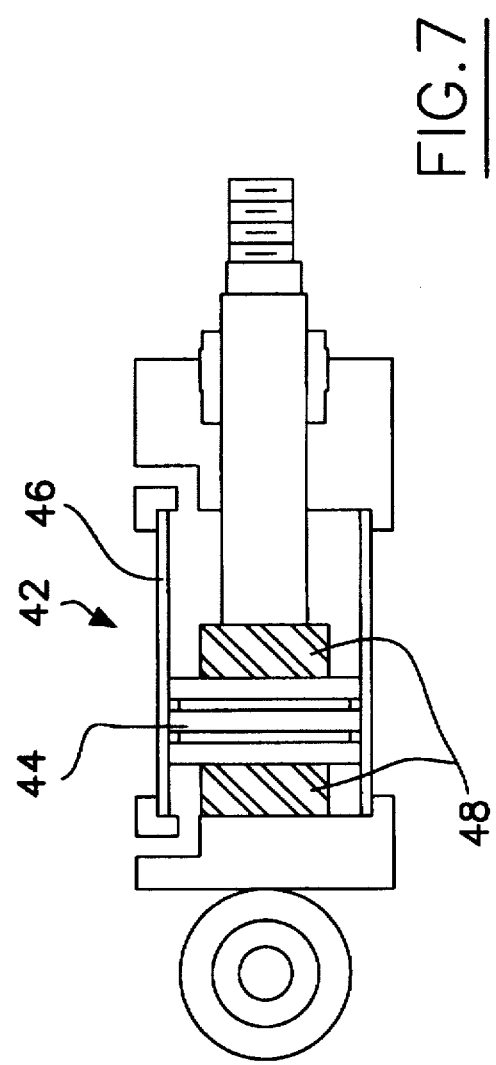

5,680,888

SAW TRIMMER AND METHOD FOR TRIMMING LUMBER PIECES

BACKGROUND

In the saw milling industry, it is of common practice to cut wood boards to produce lumber pieces of various standard or custom lengths. Such lumber pieces are mainly intended for use in the construction industry. To cut these lumber pieces, a saw trimmer is used.

Conventional saw trimmers usually comprise a plurality of parallel drop saw assemblies pneumatically actuated and controlled by a computer for optimizing the trimming of the lumber pieces conveyed in succession by a conveyor. Each drop saw assembly comprises a circular saw blade that is moved very quickly in a vertical plane for trimming a given lumber piece on the conveyor. The sudden impact of the saw blade on the lumber piece may cause unwanted displacements of the lumber piece, itself usually moving at a relative high speed. Beyond a given threshold, the quality and the precision of the trimming may suffer if the lumber piece is not guided properly while trimmed. The production rate of the saw trimmer is generally limited due to this factor.

SUMMARY

One of the objects of the present invention is to provide a saw trimmer that provides a means for suitably guiding the lumber pieces while they are trimmed, thereby improving the quality and the precision of the trimming.

More particularly, the object of the present invention is to provide a saw trimmer for trimming lumber pieces, the saw trimmer comprising:
- conveyor means for longitudinally moving lumber pieces across the saw trimmer from an input end to an output end thereof, the lumber pieces being transversely disposed on the conveyor means with reference to the longitudinal direction;
- at least two drop saw assemblies located above the conveyor means for selectively trimming the lumber pieces;
- at least two guiding means, one for each drop saw assembly, for longitudinally guiding and maintaining the lumber pieces while they are trimmed, each guiding means comprising:
  - a pair of spaced-apart and parallel elongated rails positioned above the conveyor means and extending longitudinally on a respective side of the corresponding drop saw assembly for engaging an upper surface of the lumber pieces at least during the trimming thereof;
  - a pair of parallel rolls, each roll being positioned under a respective rail and having an upper edge emerging above the conveyor means for engaging a bottom surface of the lumber pieces during the trimming thereof; and
- roll motor means for driving the rolls into rotation; and
- computer means for controlling and synchronizing the conveyor means, the drop saw assemblies and the roll motor means.

It is also an object of the present invention to provide a method for trimming a lumber piece in a saw trimmer, the method comprising the steps of:
- conveying the lumber piece on a conveyor means across the saw trimmer and in a longitudinal direction from an input end to an output end thereof, the lumber piece being transversely disposed with reference to the longitudinal direction;
- retaining the lumber piece at least during the trimming thereof, the lumber piece being held by means of a plurality of spaced-apart and parallel elongated rails positioned above the conveyor means and extending longitudinally, and by a plurality of powered rolls positioned under a corresponding rail and parallel to the longitudinal direction, each roll having an upper edge emerging above the conveyor means for engaging a bottom surface of the lumber piece; and
- trimming the lumber piece with at least one drop saw assembly located above the conveyor means, the drop saw assembly comprising:
  - a powered circular saw blade parallel to the longitudinal direction, the saw blade being adjacent to the rolls and located between at least two of the rails; and
  - actuated positioning means for selectively raising and lowering the saw blade, the saw blade being movable in a substantially vertical plane between an upper position and trimming position.

A non restrictive description of a preferred embodiment will now be given with reference to the appended drawings.

BRIEF DESCRIPTION OF THE DRAWINGS

FIG. 6 is a side view of the actuator used in the drop saw assembly in FIG. 1.

FIG. 7 is a cross-sectional view of the actuator according to line VI—VI in FIG. 6.

IDENTIFICATION OF THE COMPONENTS

Figure 1:
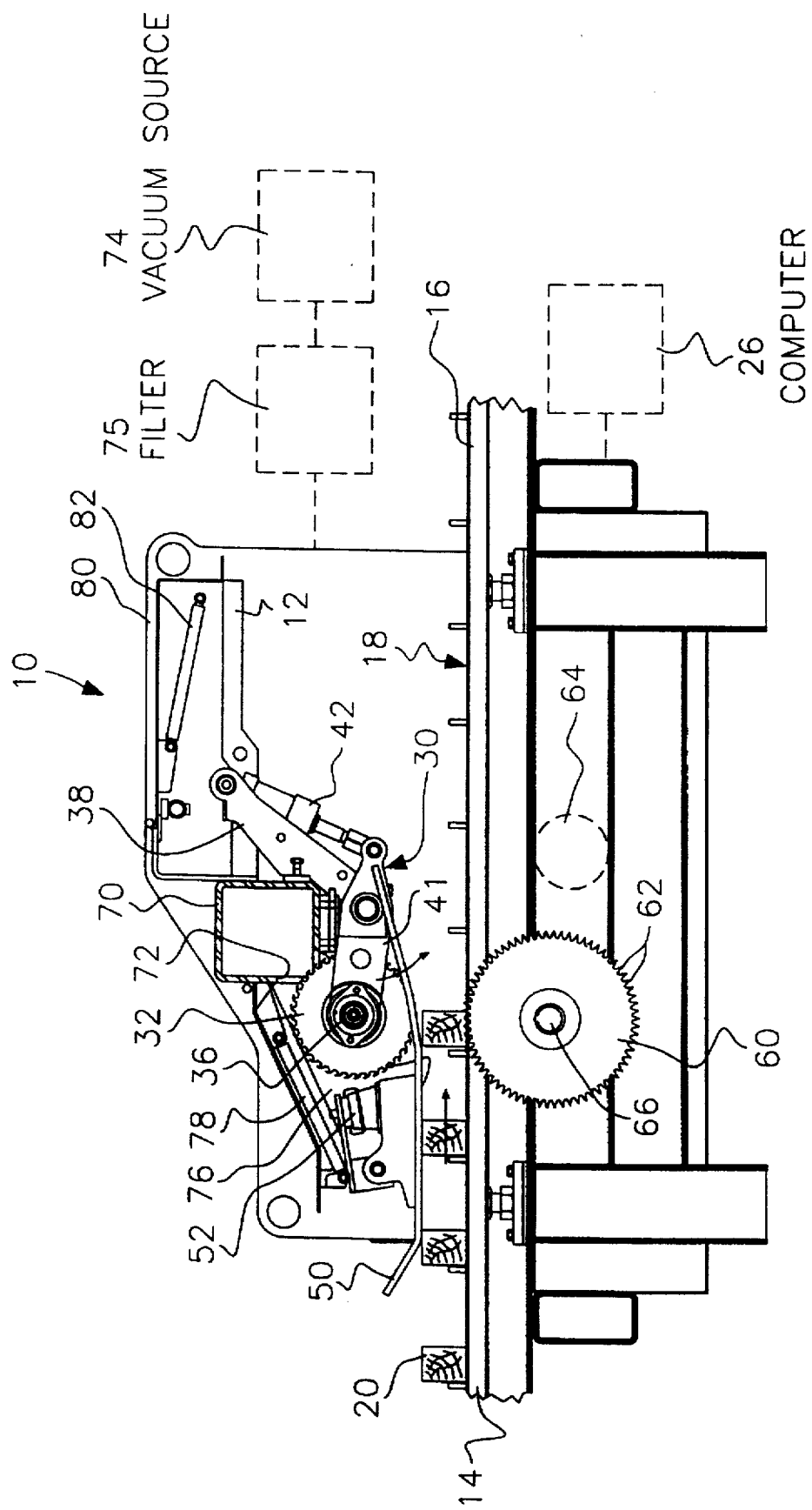
FIG. 1 is a longitudinal cross-sectional view of the saw trimmer according to a preferred embodiment of the present invention.
Figure 2:
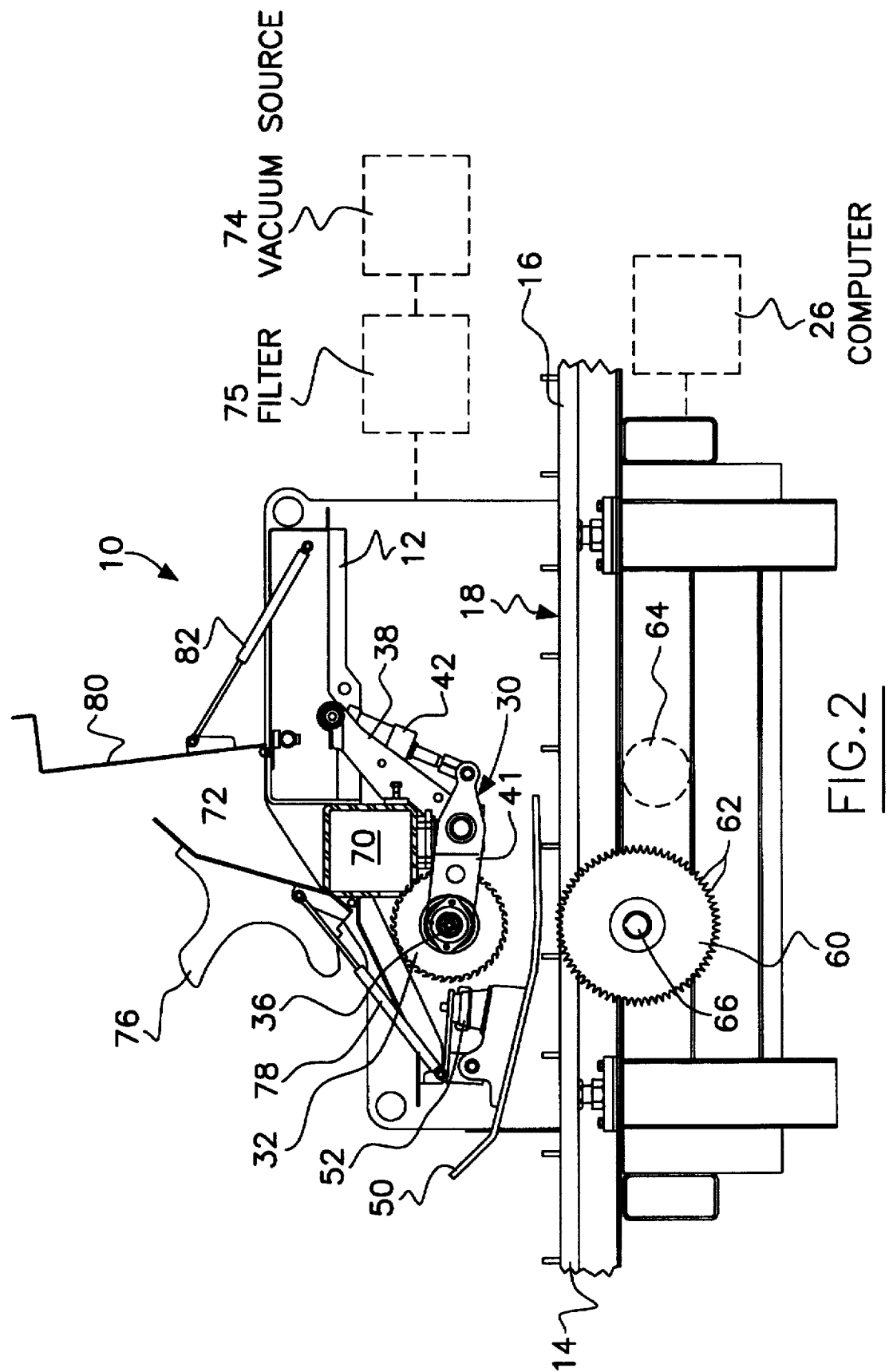
FIG. 2 is a view similar to FIG. 1, showing the saw trimmer while not in use.

The following is a list of the reference numerals, along with the names of the corresponding components, that are used in the appended drawings and in the description. This list is only given for the convenience of the readers and should not be interpreted as restricting the scope or spirit of the present invention.

10 saw trimmer
12 frame member
14 input end
16 output end
18 conveyor
20 lumber pieces
26 computer
30 drop saw assembly
32 saw blade
34 saw blade holder
36 saw blade motor
38 bracket assembly
39 dual supporting arms
40 connecting plates
41 lever arms
42 pneumatic actuators
44 piston (of the actuator)
46 cylinder (of the actuator)

48 damper elements (of the piston)
50 rails
52 pneumatic suspension
60 rolls
62 teeth (of the rolls)
64 motor
66 shaft
70 hollow tube
72 aperture
74 vacuum source
75 filter
76 saw guard
78 lift support (of the saw guard)
80 access panel
82 lift support (of the access panel)

DESCRIPTION

A saw trimmer (10) according to a preferred embodiment of the present invention is described hereinafter and shown in the appended drawings. The saw trimmer (10) is used for trimming lumber pieces (20) to the required lengths. A computer (26) is generally used for managing the operation of the saw trimmer (10). The computer (26) receives signals from mechanical or optical sensors (not shown) and the lumber pieces (20) are trimmed according to a given pattern for optimizing the production.

The saw trimmer (10) comprises a conveyor (18) for longitudinally moving lumber pieces (20) across the saw trimmer (10) from an input end (14) to an output end (16) thereof. The conveyor (18) comprises the usual elements, such as a motor (64), and is preferably a lug chain conveyor (18). The lumber pieces (20) are transversely disposed on the conveyor (18) with reference to the longitudinal direction.

Figure 3:
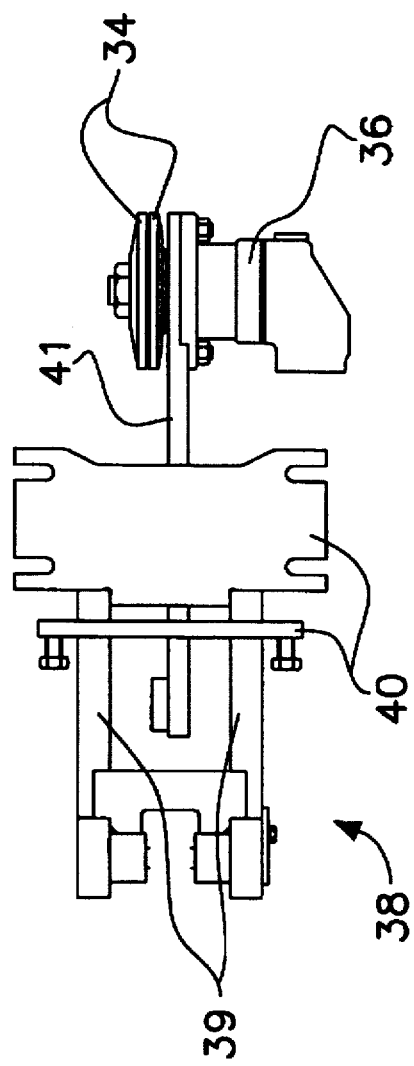
FIG. 3 is a top view of the drop saw assembly in FIG. 1, shown without the actuator and the saw blade.

Multiple drop saw assemblies (30) are disposed side by side at various locations across the width of the saw trimmer (10). A typical saw trimmer has 12 to 24 drop saw assemblies. Each drop saw assembly (30) comprises a saw blade (32), usually circular, parallel to the longitudinal direction and held by a two-part saw blade holder (34), as shown in FIG. 3. A typical circular saw blade is made of carbide and has a diameter of 10". The rotation speed of a 10" saw blade is about 6500 RPM. Each saw blade (32) is driven into rotation by a corresponding saw blade motor (36). Preferably, the saw blade motors (36) are high efficiency hydraulic motors. The motors (36) should be able to withstand a sudden pressure rise should the saw blade (32) become jammed. In such circumstances, the pressure may typically rise up to 5,500 psi. Also, due to the very high rotation speeds, a cooling system (not shown) is provided for cooling and lubricating the bearings of the saw blade motors (36).

The motors (36) are preferably connected in pairs to a hydrostatic pump (not shown). Two or three hydraulic pumps are driven by a single 30 HP electric motor (not shown). For instance, in a saw trimmer with 12 drop saw assemblies, there would be 6 pumps and 2 electric motors. Filters, check valves and all the other usual elements (not shown) of a hydraulic system are provided, as apparent to a person skilled in the art. It is also advantageous to provide a system for detecting any clogging of the filters, thereby preventing potential damages.

Actuated positioning means are used for selectively raising and lowering a corresponding saw blade (32) in a substantially vertical plane. The appropriate actuated positioning means are activated by the computer (26) that manages the operations in View of the optimum trimming pattern. Each saw blade (32) is movable between an upper resting position and a lower trimming position. At the upper resting position, the saw blades (32) are waiting for a signal from the computer (26) that will activate the corresponding actuated positioning means. Meanwhile, lumber pieces (20) are allowed to pass under those saw blades (32) without being trimmed. Whenever a particular drop saw assembly (30) is selected, the actuated positioning means begins a cycle during which the saw blade (32) is swung towards the lower trimming position. The lumber piece passing under this drop saw assembly (30) is trimmed almost instantly by its saw blade (32). As soon as the trimming is completed, the saw blade (32) is swung back towards the upper resting position, clearing the way for the following lumber pieces (20) while still being ready for the next trimming. This movement is achieved in about 0.300 seconds to keep up with the high production speed.

Figure 5:
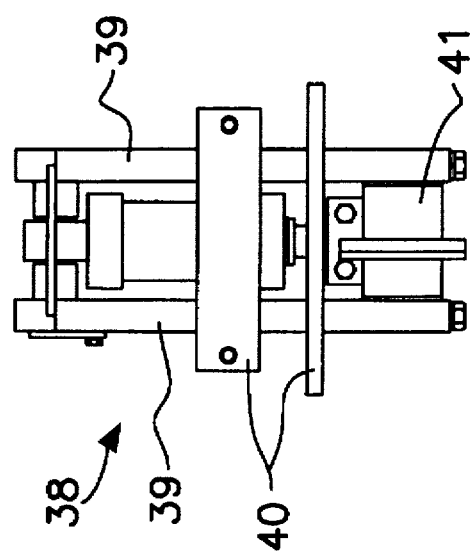
FIG. 5 is a front elevational view of the drop saw assembly in FIG. 1, shown without the saw blade.
Figure 4:
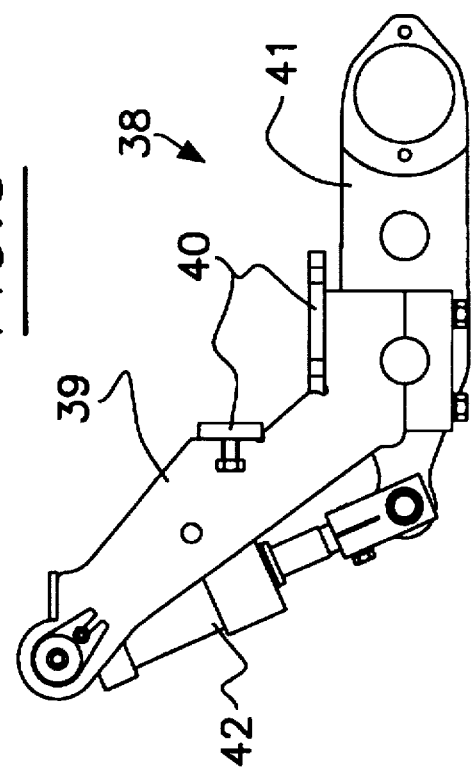
FIG. 4 is a side elevational view of the drop saw assembly in FIG. 1, shown without the saw blade, the saw blade holder and the saw blade motor.

In the preferred embodiment, each actuated positioning means comprises a pneumatic actuator (42) mounted in a corresponding bracket assembly (38). The bracket assembly (38) may be in the form of dual supporting arms (39) extending obliquely with reference to the longitudinal direction. A first connecting device, such as connecting plates (40) with sets of bolts and nuts (FIGS. 3 to 5), is used for securing the bracket assembly (38) to a frame member (12) of the saw trimmer (10). A lever arm (41) is pivotally connected to the lower end of the bracket assembly (38). This lower arm (41) bears the saw blade (32) and the corresponding saw blade motor (36). A second connecting device, such as bolts and nuts, is provided for connecting the saw blade (32) and the saw blade motor (36) to an opening in the end of the lever arm (41). The pneumatic actuator (42) is pivotally connected to the lever arm (41) and to the upper end of the bracket assembly (38) for pivoting the lever arm (41). The pneumatic actuator (42) is connected to an end of the corresponding lever arm (41) opposite the saw blade (32). The operation of the actuators (42) is achieved by the computer (26) using appropriate pneumatic valves (not shown), as apparent to a person skilled in the art.

Since each actuator (42) is operated very quickly, damper elements (48) have been designed for damping the impacts of the piston (44) with the cylinder (46) at stroke ends, thereby reducing the mechanical stresses in the parts and improving the service life thereof. The damper elements (48) are provided on each side of the piston (44). These damper elements (48) are preferably urethane disks.

To obtain a precise and high quality trimming, each drop saw assembly (30) has a corresponding guiding assembly. Each guiding assembly comprises a pair of spaced-apart and parallel elongated rails (50) positioned above the conveyor (18) and extending longitudinally. The rails (50) have at least a portion upstream the saw blades (32) in their trimming position for engaging the upper surface of the lumber pieces (20). The end of this first portion is curved upwardly for guiding the lumber pieces (20). The rails (50) are positioned on a respective side of the saw blade (32) of the corresponding drop saw assembly (30). Of course, more rails (50) can be provided, if desired.

The rails (50) of each pair are preferably connected together and the upstream end thereof and biased downwardly by a pneumatic suspension (52) for keeping a relatively constant pressure. Alternatively, one may rely only to the weight of the rails (50) or to springs (not shown).

The guiding assembly further comprises a pair of rolls (60) provided under a corresponding rail (50). Additional rolls (60) may be provided under all or some of the other rails (50), if any. Each roll (60) is parallel to the longitudinal direction and positioned under the corresponding rail (50) with an upper edge thereof slightly emerging above the conveyor (18). Typically, the upper edge extends above the lower level of the conveyor (18) of about ⅛", which is generally enough for spiking the bottom surface of the lumber pieces (20) during the trimming thereof with the plurality of teeth (62) that projects axially from the roll (60). Alternatively, a rubber peripheral pad (not shown) may be used if, for example, the bottom surface of the lumber pieces (20) must not be damaged. Also, the expression "rolls"includes variants such as small conveyors that provide the same advantages.

The rolls (60) are driven individually or together into rotation. They may all be mounted on a transversal shaft (66) that is mechanically connected to the conveyor (18), itself driven by the motor (64). The peripheral speed and direction of rotation is synchronized with the movement of the conveyor (18). However, it is possible to slightly increase the peripheral speed of the rolls (60) to slightly move the lumber pieces (20) away from the lugs, if any, of the conveyor (18). Typically, the increase is about 5% and is achieved by ratio between gears. As a result, the lumber pieces (20) are maintained only by the guiding means while being trimmed.

As aforesaid, a computer (26) is used for controlling and synchronizing the operations. It should be noted however that the term "computer"does not necessarily need to be a computer with a microprocessor and a less sophisticated and automatic electrical circuit may be used as well.

The saw trimmer (10) may further comprise a saw dust collector for collecting dusts generated by the saw blades (32) during the trimming of lumber pieces (20). This collector preferably comprises a hollow tube (70) transversally disposed with reference to the longitudinal direction and provided with an aperture (72) adjacent to each of the drop saw assemblies (30). A suitable vacuum source (74) generates a vacuum in the tube (70). A saw dust guide, integral with the interior side of each saw guard (76), partially surrounds the drop saw assembly (30) for collecting the dusts generated during the trimming. The interior side of the saw guard (76) is in fluid communication with a corresponding aperture (72) of the tube (70). A suitable dust separator or filter (75) is used for removing the airborne dusts particles. The saw guards (76) comprise corresponding lift supports (78) for accessing easily the saw blades (32). Upper access panels (80), with corresponding lift supports (82), are also provided for maintenance and cleaning.

In use, each lumber piece (20) is conveyed on the conveyor (18) across the saw trimmer (10) and in a longitudinal direction from the input end (14) to the output end (16) thereof. The lumber piece (20) is transversely disposed on the conveyor (18) with reference to the longitudinal direction. Then, the lumber piece (20) is retained at least during the trimming thereof. The lumber piece (20) is held by means of the rails (50). The powered rolls (60) engage the bottom surface of the lumber piece (20). At that moment, the lumber piece (20) is held between these parts and the trimming occurs as at least one of the drop saw assemblies (30) is lowered for instantly cutting the lumber piece (20). The lumber piece (20) is still moving longitudinally at all times. The trimmed lumber piece (20) continues on the conveyor (18) after the trimming and leaves the saw trimmer (10) through the output end (16) thereof.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A saw trimmer for trimming lumber pieces, the saw trimmer comprising:

conveyor means for longitudinally moving lumber pieces across the saw trimmer from an input end to an output end thereof, the lumber pieces being transversely disposed on the conveyor means with reference to the longitudinal direction;

at least two drop saw assemblies located above the conveyor means for selectively trimming the lumber pieces;

at least two guiding means, one for each drop saw assembly, for longitudinally guiding and maintaining the lumber pieces while they are trimmed, each guiding means comprising: at least one elongated rail positioned above the conveyor means and extending longitudinally on a side of the corresponding drop saw assembly for engaging an upper surface of the lumber pieces at least during the trimming thereof;

at least one roll generally positioned under and parallel to the conveyor means, the roll having an upper edge emerging above the conveyor means for engaging a bottom surface of the lumber pieces during the trimming thereof; and roll motor means for driving the roll into rotation; and computer means for controlling and synchronizing the conveyor means, the drop saw assemblies and the roll motor means.

2. A saw trimmer according to claim 1, wherein each drop saw assembly comprises:

a saw blade parallel to the longitudinal direction;

saw blade motor means for driving the saw blade into rotation; and actuated positioning means for selectively raising and lowering the saw blade, the saw blade being movable in a substantially vertical plane between an upper position and a trimming position.

3. A saw trimmer according to claim 2, wherein the actuated positioning means comprise:

a bracket assembly having a lower end and an opposite upper end;

first connecting means for securing the bracket assembly to a frame member of the saw trimmer;

a lever arm pivotally connected to the lower end of the bracket assembly, the lever arm having a pivot axis;

second connecting means for mounting the saw blade and the saw blade motor at one end of the lever arm; and a pneumatic actuator pivotally connected to the lever arm and to the upper end of the bracket assembly for pivoting the lever arm.

4. A saw trimmer according to claim 3, wherein the pneumatic actuator is connected to an end of the lever arm opposite the saw blade.

5. A saw trimmer according to claim 3, wherein the bracket assembly comprises dual arms extending obliquely with reference to the longitudinal direction.

6. A saw trimmer according to claim 3, wherein the pneumatic actuator comprises:

a cylinder;

a piston reciprocally movable inside the cylinder; and a pair of damper elements, each located on a corresponding side of the piston for damping impacts at stroke ends thereof.

7. A saw trimmer according to claim 6, wherein each of the damper elements comprises a urethane disk.

8. A saw trimmer according to claim 1, wherein the guiding means further comprises a pneumatic suspension means for pressing the rails downwardly against the upper surface of the lumber pieces according to a substantially constant pressure.

9. A saw trimmer according to claim 1, wherein the edge of each roll comprises a plurality of axial projecting teeth.

10. A saw trimmer according to claim 1, wherein the conveyor means comprise a lug chain conveyor.

11. A saw trimmer according to claim 1, further comprising saw dust vacuum means for collecting dusts generated by each drop saw assembly during the trimming of lumber pieces.

12. A saw trimmer according to claim 11, wherein the saw dust vacuum means comprises:
a hollow tube transversally disposed with reference to the longitudinal direction and provided with an aperture adjacent to the drop saw assembly;
a saw dust guide partially surrounding the drop saw assembly and in fluid communication with a corresponding aperture of the tube; and
means for generating a vacuum in the tube.

13. A saw trimmer according to claim 2, wherein the saw blade motor means comprises a hydraulic motor.

14. In a saw trimmer for trimming lumber pieces, the saw trimmer comprising:
conveyor means for longitudinally moving lumber pieces across the saw trimmer from an input end to an output end thereof, the lumber pieces being transversely disposed on the conveyor means with reference to the longitudinal direction;
at least two drop saw assemblies located above the conveyor means for selectively trimming the lumber pieces; and
computer means for controlling and synchronizing the conveyor means and the drop saw assemblies;
the improvement comprising:
at least two guiding means, one for each drop saw assembly, for longitudinally guiding and maintaining the lumber pieces while they are trimmed, each guiding means comprising:
at least one elongated rail positioned above the conveyor means and extending longitudinally on a side of the corresponding drop saw assembly for engaging an upper surface of the lumber pieces at least during the trimming thereof;
at least one roll generally positioned under and parallel to a respective rail, the roll having an upper edge emerging above the conveyor means for engaging a bottom surface of the lumber pieces during the trimming thereof; and
roll motor means for driving the roll into rotation, the roll motor means being controlled and synchronized with the conveyor means and the drop saw assemblies by the computer means.

15. An improved saw trimmer according to claim 14, wherein each drop saw assembly comprises:
a saw blade parallel to the longitudinal direction;
saw blade motor means for driving the saw blade into rotation; and
actuated positioning means for selectively raising and lowering the saw blade, the saw blade being movable in a substantially vertical plane between an upper position and a trimming position.

16. An improved saw trimmer according to claim 15, wherein the actuated positioning means comprise:
a bracket assembly having a lower end and an opposite upper end;
first connecting means for securing the bracket assembly to a frame member of the saw trimmer;
a lever arm pivotally connected to the lower end of the bracket assembly, the lever arm having a pivot axis;
second connecting means for mounting the saw blade and the saw blade motor at one end of the lever arm; and
a pneumatic actuator pivotally connected to the lever arm and to the upper end of the bracket assembly for pivoting the lever arm.

17. An improved saw trimmer according to claim 16, wherein the pneumatic actuator is connected to an end of the lever arm opposite the saw blade.

18. An improved saw trimmer according to claim 16, wherein the bracket assembly comprises dual arms extending obliquely with reference to the longitudinal direction.

19. An improved saw trimmer according to claim 16, wherein the pneumatic actuator comprises:
a cylinder;
a piston reciprocally movable inside the cylinder; and
a pair of damper elements, each located on a corresponding side of the piston for damping impacts at stroke ends thereof.

20. An improved saw trimmer according to claim 19, wherein each of the damper elements comprises a urethane disk.

21. An improved saw trimmer according to claim 14, wherein the edge of each roll comprises a plurality of axial projecting teeth.

22. An improved saw trimmer according to claim 14, wherein the guiding means further comprises a pneumatic suspension means for pressing the rails downwardly against the upper surface of the lumber pieces according to a substantially constant pressure.

23. An improved saw trimmer according to claim 14, wherein the conveyor means comprise a lug chain conveyor.

24. An improved saw trimmer according to claim 14, further comprising saw dust vacuum means for collecting dusts generated by each drop saw assembly during the trimming of lumber pieces.

25. An improved saw trimmer according to claim 24, wherein the saw dust vacuum means comprises:
a hollow tube transversally disposed with reference to the longitudinal direction and provided with an aperture adjacent to the drop saw assembly;
a saw dust guide partially surrounding the drop saw assembly and in fluid communication with a corresponding aperture of the tube; and
means for generating a vacuum in the tube.

26. A method for trimming a lumber piece in a saw trimmer, the method comprising the steps of:
conveying the lumber piece on a conveyor means across the saw trimmer and in a longitudinal direction from an input end to an output end thereof, the lumber piece being transversely disposed with reference to the longitudinal direction;
retaining the lumber piece at least during the trimming thereof, the lumber piece being held by means of a plurality of spaced-apart and parallel elongated rails positioned above the conveyor means and extending longitudinally, and by a plurality of powered rolls positioned under a corresponding rail and parallel to the longitudinal direction, each roll having an upper edge emerging above the conveyor means for engaging a bottom surface of the lumber piece; and trimming the lumber piece with at least one drop saw assembly located above the conveyor means, the drop saw assembly comprising:
 a powered circular saw blade parallel to the longitudinal direction, the saw blade being adjacent to the rolls and located between at least two of the rails; and
 actuated positioning means for selectively raising and lowering the saw blade, the saw blade being movable in a substantially vertical plane between an upper position and a trimming position.

27. A method for trimming a lumber piece in a saw trimmer, the method comprising the steps of:

conveying the lumber piece on a conveyor means across the saw trimmer and in a longitudinal direction from an input end to an output end thereof, the lumber piece being transversely disposed with reference to the longitudinal direction;

retaining the lumber piece at least during the trimming thereof, the lumber piece being held by means of a plurality of spaced-apart and parallel elongated rails positioned above the conveyor means and extending longitudinally, and by a plurality of powered rolls generally positioned under the conveyor means and parallel to the longitudinal direction, each roll having an upper edge emerging above the conveyor means for engaging a bottom surface of the lumber piece; and trimming the lumber piece with at least one drop saw assembly located above the conveyor means, the drop saw assembly comprising:
 a powered circular saw blade parallel to the longitudinal direction;and
 actuated positioning means for selectively raising and lowering the saw blade, the saw blade being movable in a substantially vertical plane between an upper position and a trimming position.

* * * * *